Oct. 8, 1935.  C. S. ASH ET AL  2,016,584
METHOD OF TREATING FRUIT JUICES
Filed May 23, 1932
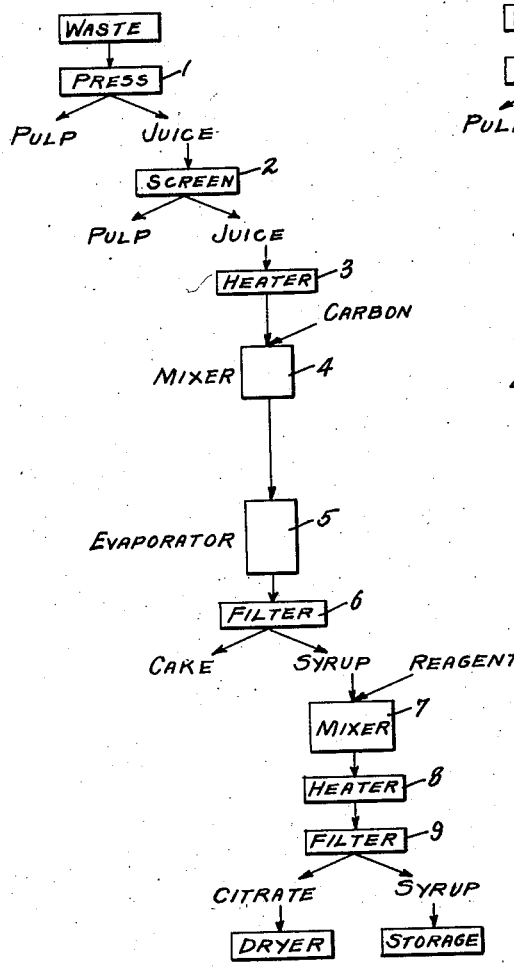
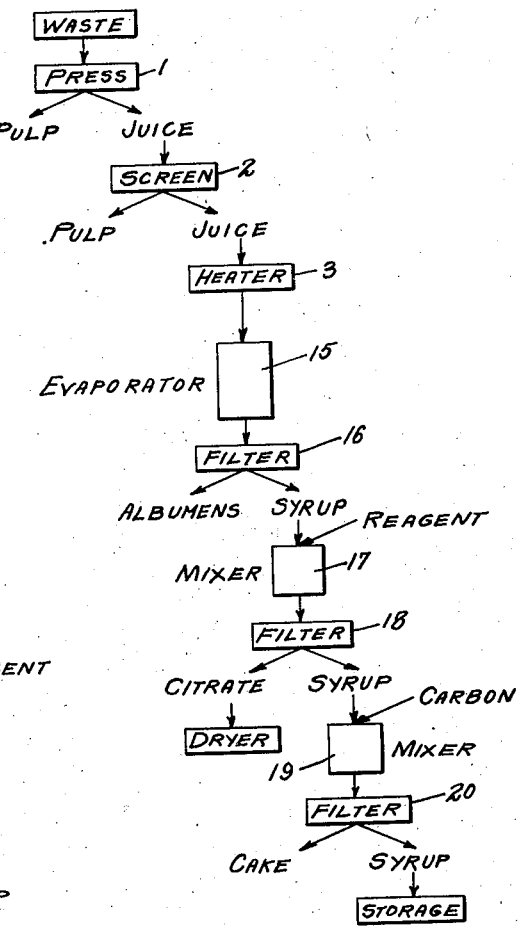
Inventors
Charles S. Ash
Edward P. Roleson
By Lyon & Lyon
Attorneys Patented Oct. 8, 1935

2,016,584

UNITED STATES PATENT OFFICE 2,016,584

METHOD OF TREATING FRUIT JUICES

Charles S. Ash and Edward P. Roleson, San Francisco, Calif., assignors to California Packing Corporation, San Francisco, Calif., a corporation of New York Application May 23, 1932, Serial No. 613,012

19 Claims. (Cl. 99—11)

This invention relates to a method of treating fruit juices for the purpose of recovering values therefrom in a particularly efficacious, rapid and economical manner. More specifically, the invention is particularly directed toward a method of treating fruit juices which contain invert sugars and sucrose, as well as other acids such as citric or tartaric acid, whereby a sirup capable of being utilized as a sweetening agent, as a source of sugar, as a medium in which fruits may be packed, and for other edible purposes, may be recovered from the fruit juice and the fruit acids separately recovered as an article of manufacture for use in any desired manner.

Although the process of this invention is applicable to fruit juice obtained from various fruits, provided such juice contains sugars and fruit acids in appreciable quantities, the subsequent detailed description of the invention will be particularly directed toward the application of the process to the treatment of pineapple juice.

In the canning of pineapple, it is customary to trim the fruit so as to remove the outside horn-like covering together with a variable quantity of the meat itself, as well as the top and bottom wastage. Furthermore, the more fibrous core of the pineapple is often removed. The exterior portions of the fruit as well as the core differ but little in composition from that of the fruit itself. The juice from this wastage may be extracted in part either by pressing or by diffusion methods, or a combination of the two. In a prior patent, No. 1,166,674, issued to Ralph A. Gould and Charles S. Ash, a method of converting this juice into a sirup has been disclosed. Such sirup may be utilized in the canning of the pineapple, generally a certain portion of sucrose being added to the sirup in order to impart a desired sugar content and sweetness thereto before the sirup is poured into the containers in which the pineapple is packed.

The prior patent referred to hereinabove also contemplated the recovery of citric acid from the pineapple juice. It has been found, however, that only about 40% to 48% of the total citric acid could be recovered from the juice in accordance with the method described. Furthermore, it was difficult to produce a uniform sirup which would be light in color and free from an undesired taste.

The present invention may be said to disclose and provide an improved method of treating fruit juices such as pineapple juice, whereby a substantially clear sirup of uniform quality free from the objectionable flavors, can be obtained and in addition the recovery of citric acid practically doubled. Moreover, the process of this invention is much more economical in actual operation in that the number of operations is materially reduced, thereby obviating the necessity of maintaining as large a quantity of juice in process and the necessity of pumping and filtering very large quantities of liquor for the production of a given quantity of sirup.

For example, whereas 2600 gallons of liquor were filtered, settled or centrifuged for every 1000 gallons of juice received into the process, the present invention contemplates a method whereby only 600 gallons are filtered, settled or centrifuged for every 1000 gallons of juice received into the process. Another point of distinction of great importance is that in the prior processes, the removal of citric acid by precipitation with a neutralizing agent capable of forming insoluble salts of citric acid, was carried out on the dilute juice whereas in the process of this invention, such precipitation of citric acid is carried out on concentrated juice. This novel step, together with a preferred temperature control during such step, permits the formation of larger, more easily washed crystals and the recovery of a much larger amount of citric acid.

An object of this invention, therefore, is to disclose and provide a method of treating fruit juices containing invert sugars, sucrose and fruit acids, for the manufacture of a sirup and salts of fruit acid therefrom.

Another object of the invention is to disclose and provide a method of removing acid and color from fruit juices whereby substantially all of the acid present in the juice may be recovered.

A further object of the invention is to disclose and provide a method of purifying and concentrating fruit juices for the purpose of producing a sirup whereby the decolorization of the liquor may be carried out most effectively.

A still further object of the invention is to disclose and provide a method of treating fruit juices for the recovery of fruit acids therefrom whereby high yields of fruit acids may be recovered.

A still further object of the invention is to disclose and provide a method of treating pineapple juice for the recovery of a decolorized sirup and citric acid in an economical and rapid manner.

A still further object of the invention is to disclose and provide a method of treating pineapple juice whereby a decolorized sirup substantially free from objectionable flavors may be readily produced.

These and other objects, uses and advantages of this invention will become apparent to those skilled in the art from the following detailed description of a preferred mode of operation and several modifications thereof.

During the operation of this process, the fruit juices are concentrated by evaporation and all such concentrated juices will hereinafter be referred to as "sirups". The concentration may be carried out to any desired extent, in the treatment of pineapple juice the sirup generally containing more than 20% by weight of total dissolved solids. Furthermore, it is to be understood that such sirups contain invert sugars such as fructose, dextrose, etc., and may or may not contain sucrose as well as other bodies.

The description of the invention will be facilitated by reference to the appended drawing, in which Fig. 1 is a flow diagram indicating the sequence of the major operations which may be followed in a preferred embodiment of the process.

Fig. 2 is a flow diagram of a modified process coming within the scope of this invention.

Although as has been stated hereinbefore the process of this invention is applicable to the treatment of various fruit juices other than those derived from pineapples, the subsequent description of the invention will be particularly directed toward the application of the process to pineapple juice.

The pineapple waste consisting of the exterior portions of the fruit and the core, is pressed at 1 for the purpose of extracting and separating the juice from the pulp. Instead of employing presses, a diffusion process may be used. It is to be understood that before a pressing or diffusion operation for the extraction of the juice, the waste matter may be shredded, rolled or otherwise treated. The pulp thus separated from the juice at 1 may be utilized as fuel or may be treated in a manner described in a co-pending application, Serial No. 601,715, for the production of a suitable cattle and stock food.

The fruit juice may in addition be subjected to a screening operation, indicated at 2, for the purpose of removing the finer fibers and pulpy matter still in suspension in the juice. Instead of screening, centrifugal separators or any other mechanical means may be employed. The fibrous material removed at 2 may be combined with the pulp resulting from the pressing operation.

The screened juice may then be passed through a heater 3 wherein the temperature of the juice is raised to about 180° F.–200° F. in order to precipitate those albumens which are coagulatable by the action of heat. The heated juice is then mixed in a suitable apparatus, indicated at 4, with a decolorizing agent such as activated carbon, bone-char, clay, silica gel, or other adsorbent. If the decolorizing carbon is very finely subdivided, or if the juice still contains very finely divided suspended impurities, a filter-aid such as diatomaceous earth may be added at the same time.

The acid juice containing the decolorizing agent is then passed into suitable evaporators 5 wherein the juice is evaporated, preferably under vacuum, until a desired concentration of solids in solution is obtained.

It is to be here noted that the concentration is thus carried out in the presence of the decolorizing agent and furthermore that an acid juice is being concentrated. When an acid juice is being concentrated, the decomposition of the juice is prevented, whereas the concentration or evaporation of an alkaline juice gives rise to objectionable odors and flavors caused by decomposition. Moreover, glucosans and dark colored bodies are not formed and instead the adsorbent most effectively adsorbs and retains coloring bodies. Foaming, such as occurs when a neutral juice is evaporated, is prevented when the evaporation is carried out on acid juice and in the presence of a decolorizing agent.

In other words, the juice containing coagulated albumens, etc., is converted into a sirup in the evaporators 5. This sirup is then filtered, centrifuged or otherwise treated for the removal of the suspended solids therefrom. A filtration operation is indicated at 6. If desired, a filter-aid such as diatomaceous silica, may be added to the sirup at some point between the evaporator 5 and the filter 6. The albumens which were precipitated by the action of the heat on the juice, together with the carbon and adsorbed coloring matter, as well as any remaining suspended solids, are thus removed from the sirup.

The partially refined sirup, which is still acid in character because of the contained free acid, is then mixed as indicated at 7 with a neutralizing agent capable of forming insoluble salts of the acid, namely, citric acid when pineapple juice is used. Of the various neutralizing agents, the alkaline earths such as calcium, barium and strontium, may be used. The preferable reagent is a lime salt such as calcium hydroxide or calcium carbonate. These reagents are added to the sirup in mixing tank 7 in quantities sufficient to precipitate the desired quantity of the acid contained in the sirup. In practice, these reagents are added in quantities to precipitate all of the citric acid without rendering the sirup alkaline.

In order to produce large and granular crystals of the insoluble citrate, an operation which we term "cold liming" is employed. In carrying out this operation, the clarified sirup, free from carbon and other suspended impurities, is discharged by the filter or centrifugal 6 and at a temperature of between about 110° F. and 130° F. is mixed with the neutralizing reagent capable of forming insoluble citrates in the mixer 7. The mixture is then heated as in the heater 8 to a temperature above 160° F. and preferably between 160° F. and 210° F. This heating operation causes the crystals of calcium citrate to precipitate and grow in the sirup. Calcium citrate, for example, is relatively soluble in sugar solutions at low temperatures, such as temperatures below 130° F. but as the temperature of the mixture is raised, the calcium citrate becomes more insoluble. The calcium citrate here precipitated is in the form of large and flaky crystals that may thereafter be easily separated from the sirup either by a filter press or by centrifugal action as at 9. When a centrifugal is used, it is preferably provided with a perforated bowl.

The citrate is washed to remove most of the occluded or entrained sirup and is then dried. It is to be understood that this calcium citrate may be treated in any desired and well known manner for the production of citric acid or other products. The now substantially neutral decolorized sirup may be sent to storage or used in any desired manner. When such sirup is to be employed in the packing of pineapple, a certain amount of sugar may be dissolved therein before the sirup is used in filling the cans of pineapple.

It is to be understood that after the filtration indicated at 6, wash water may be passed through the filter for the purpose of removing as much of the entrained sirup as possible. This wash water may be made a part of the sirup and passed to the mixer 7 or otherwise used. The hot wash water used in the filtration operation indicated at 9 may also be made a part of the sirup or merely the first part of such wash water may be discharged with the sirup, the remaining portion being otherwise used.

In the above operation, therefore, the acid juice is decolorized and concentrated to a sirup in the presence of the decolorizing agent and filtered, and the citric acid is precipitated from the filtered sirup. It has been found that this sequence of operation insures thorough decolorization and the recovery of substantially all of the citric acid from the sirup. Moreover, the resulting sirup is free from objectionable flavors whereas the prior process was not always satisfactory in this respect.

The high yields of citric salts obtainable by this process are primarily due to the precipitation of the citrate from a concentrated juice or sirup. The calcium citrate is much less soluble in concentrated sugar solutions than in dilute solutions. For example, although 1.8 grams of calcium citrate will dissolve in a 5% sucrose solution, only 1.4 grams will dissolve in a 20% sucrose solution. Furthermore, as the formation of the citrates takes place in a sirup which may have a volume of only one-fourth or even one-sixth of that of the original juice, a much smaller volume of solvent is available. This method of operation was not utilized in the prior processes and for this reason the prior processes were only able to recover about 40% of the available citric acid. Furthermore, when the temperatures during the precipitation of the citrates are controlled as stated hereinabove, the formation of slimy and fine crystals is prevented. In the prior processes, the separation of the extremely fine and slimy crystals from the juice was extremely difficult.

Specific data on an illustrative example of the process described hereinabove may be cited. In one instance, pineapple juice was passed through screens 2 at the rate of 3000 gallons per hour. This juice was from 10° to 13° Brix and contained 0.7 to 1.3 grams of acid per 100 cc. It had a color of from about 4 to 5 malt units and was at a temperature of between 75° F. and 85° F. This juice was heated to a temperature of between 190° F. and 210° F. before being passed into a mixer wherein a vegetable decolorizing carbon was added at the rate of 3.5% to 7.5% by weight of the total solids. In addition, diatomaceous silica was added as a filter-aid. The mixing tanks were equipped with mechanical agitators. This juice was then passed through vacuum evaporators which removed approximately 2000 gallons of water per hour. The resulting sirup was filtered to remove the waste carbon, filter-aid and other solids, resulting in a decolorized acid sirup which passed to the mixers 7 at the rate of about 1000 gallons per hour. The evaporators had concentrated the sirup to a Brix of about 30° to 40°. The sirup contained 3 to 5 grams of acid per 100 cc. Calcium hydroxide was added to the sirup. The mixture of calcium hydroxide and sirup at a temperature of 110° F. to 130° F. showed an acidity of about 0.3 to 0.5 gram of acid per 100 cc. This substantially neutralized sirup was then heated to a temperature of about 190° F. and filtered for the removal of the calcium citrate.

The filtrate consisted of a decolorized sirup of between 30° and 40° Brix having a color of about 4 to 10 malt units and an acid content of from about 0.3 to 0.5 gram per 100 cc.

In the modification shown in the flow diagram of Fig. 2, the screened juice may be sent through a heater 3 as in Fig. 1 and the heated juice then passed through an evaporator 15 wherein the juice is concentrated to a desired degree. The sirup may then be filtered at 16 for the removal of precipitated and coagulated albumens, etc. The partially purified sirup may then be sent to a mixing tank 17 and the neutralizing agent, such as oxide or hydroxide or other salt of an alkaline earth, is added. The mixture of sirup and precipitating agent is then heated and filtered as at 18 for the removal of the citrate. The substantially neutral sirup resulting from this filtration may then be sent to a mixer 19 wherein the sirup is mixed with a suitable decolorizing agent such as activated carbon. The resulting mixture may then be filtered at 20 or otherwise treated for the removal of the carbon and adsorbed impurities, whereupon the remaining sirup may be used in any desired manner.

It is to be noted that in this modification, the precipitation of the citrate occurs in a sirup, as in the process shown in Fig. 1, but whereas in process 1 the sirup was decolorized before the citrate was removed therefrom, the decolorization follows the citrate removal in the modification.

Other modifications and changes may be made in the process of this invention without departing therefrom. For example, the screened juice may be heated for the purpose of coagulating the albumens and then evaporated to form a sirup. The sirup may then be decolorized and the decoloring carbon removed therefrom. The decolorized but still acid sirup may then be mixed with a precipitating agent so as to form an insoluble salt of the acid which it is desired to remove from the sirup. The resulting precipitated acid salt may then be separated from the sirup in any suitable manner as, for example, by filtration, centrifuging, thickening, etc.

It is to be observed that in the preferred process of this invention, the decolorization of the juice or sirup always takes place when the juice is acid. When vegetable carbons are used as decolorizing agents, it is particularly desirable that the juice or sirup be on the acid side. The acidity of the juice may vary appreciably and even the substantially neutral sirups obtained after the precipitation of most of the citric acid with an alkaline earth, are capable of being decolorized with vegetable carbons when the alkaline earth has been added in a quantity sufficient to precipitate the citric acid but insufficient to render the juice alkaline. The original pineapple juice, for example, may have a pH of between about 3.2 and 4.2. After concentration, decolorization and the removal of the citric acid therefrom, the pH of the sirup may vary from about 5.0 to 6.1 with an apparent average of about 5.6.

Moreover, it is to be understood that although sirups have been defined herein as liquors that contain more than about 20% of total dissolved solids and the illustrative example cited hereinabove referred to a sirup of about 30° to 40°

Brix, the concentration or evaporation may be carried on to an extent sufficient to produce sirups of 60° Brix or more. The degree of concentration will, of course, be influenced by the sugar content of the sirup or the juice being treated and the use to which the final sirup is to be put. The resulting sirups do not darken upon standing and when concentrated to about 60° Brix, are practically imperishable. This is of great value as these sirups can then be stored between operating periods in the cannery, thus materially facilitating operation and increasing the amount of sugar recovered in a season.

Another observation which may be of value from an operating standpoint is that the calcium hydroxide may be used in lieu of calcium carbonate, without fear of producing dark colored bodies that can not be removed subsequently with a decolorizing agent such as activated charcoal. As a matter of fact, the addition of calcium hydroxide is valuable in plant operation as it stops the frothing which occurs when calcium carbonate is used and is being decomposed by the acid of the juice or sirup, it being always remembered that it can be used without danger only in practically cold solutions.

Those skilled in the art will appreciate the advantages of the process and the numerous changes and modifications that may be made.

All such changes and modifications as come within the scope of the appended claims are embraced thereby.

We claim:

1. A method of treating pineapple juice containing invert sugars, sucrose and citric acid for the manufacture of a sirup and citrates therefrom, comprising the steps of heating and concentrating the juice to form a sirup, adding an alkaline earth capable of forming a substantially insoluble citric acid salt to said sirup, separating the citric acid salt from the sirup, and finally decolorizing the sirup.

2. A method of forming sirup from pineapple waste, comprising heating the juice to precipitate albumens contained therein, evaporating the juice to form a sirup, adding an alkaline earth to the sirup in quantity sufficient to combine with substantially all citric acid in said sirup, heating the mixture to a temperature of from about 160° F. to 210° F., then separating the precipitated alkaline earth citrate from the sirup, and finally decolorizing the sirup.

3. A method of forming sirup from acid pineapple juice, comprising heating the juice to precipitate albumens contained in said juice, evaporating the acid juice to form a sirup, filtering the sirup to remove solids in suspension, adding an alkaline earth capable of forming a substantially insoluble citric acid salt to said filtered sirup in quantity sufficient to combine with substantially all citric acid present in said sirup, heating the sirup to between about 160° F. and 210° F., and separating the precipitated alkaline earth citrate from the sirup.

4. A method of forming sirup from acid pineapple juice, comprising heating the juice to precipitate albumens contained in the juice, adding a decolorizing agent to the heated juice, evaporating the acid juice in the presence of said decolorizing agent to form a sirup, separting the decolorizing agent and solids in suspension from the sirup, then adding an alkaline earth to said sirup in quantity sufficient to combine with substantially all citric acid present in said sirup, heating the sirup to a temperature of between about 160° F. and 210° F., and then separating the precipitated alkaline earth citrate from the sirup.

5. A method of forming sirup from pineapple waste, comprising extracting juice from pineapple waste, separating the juice from fibrous material, heating the juice to precipitate albumens contained in said juice, evaporating the juice to form a sirup, filtering the sirup to remove solids in suspension, adding an alkaline earth capable of forming a substantially insoluble citric acid salt to said filtered sirup in quantity sufficient to combine with substantially all citric acid present in said sirup, heating the sirup to between about 160° F. and 210° F., separating the precipitated alkaline earth citrate from the sirup, and finally decolorizing the substantially neutral sirup.

6. A method of treating acid pineapple juice which comprises adding a decolorizing agent to the pineapple juice, evaporating the acid juice in the presence of the decolorizing agent to form a sirup, removing the decolorizing agent and adsorbed impurities from the sirup, adding a neutralizing reagent capable of forming a substantially insoluble citric acid salt to the sirup in quantity sufficient to combine with substantially all citric acid present in said sirup, and then separating the precipitated citric acid salt from the sirup.

7. A method of treating acid pineapple juice which comprises, adding a decolorizing agent to pineapple juice, evaporating the acid juice in the presence of the decolorizing agent and adsorbed impurities from the sirup, adding a netralizing reagent capable of forming a substantially insoluble citric acid salt to the sirup at a relatively low temperature in quantity sufficient to combine with substantially all citric acid present in said sirup, heating the mixture to between about 160° F. and 210° F. to precipitate the citric acid salt, and then separating the precipitated citric acid salt from the sirup.

8. In a method of treating acid pineapple juice, the steps of evaporating acid pineapple juice to form a sirup, decolorizing the sirup, adding a neutralizing reagent capable of forming a substantially insoluble citric acid salt to said decolorized sirup in quantity sufficient to combine with substantially all citric acid present in said sirup, and then separating the precipitated salt from the sirup.

9. In a method of treating acid pineapple juice, the steps of evaporating acid pineapple juice to form a sirup, adding calcium hydroxide or calcium carbonate to the sirup at a relatively low temperature in quantity sufficient to combine with substantially all citric acid present in said sirup, heating the mixture to between 160° F. and 210° F. to precipitate calcium citrate, and then removing the precipitated calcium citrate from the sirup.

10. In a method of treating acid pineapple juice, the steps of heating pineapple juice to precipitate albumens contained in said juice, adding a decolorizing agent to the juice, evaporating the acid juice to form a sirup, removing the decolorizing agent and adsorbed impurities from the sirup, adding calcium hydroxide or calcium carbonate to the sirup, at a temperature below 160° F., heating the mixture to between 160° F. and 210° F. to precipitate calcium citrate, and separating the precipitated calcium citrate from the sirup.

11. In a method of treating acid pineapple juice, the steps of heating pineapple juice to precipitate albumens contained in said juice, decolorizing the juice, evaporating the acid juice to form a sirup, adding calcium hydroxide or calcium carbonate to the sirup at a temperature below about 160° F. in quantity sufficient to combine with substantially all citric acid present in said sirup, heating the mixture to between 160° F. and 210° F. to precipitate calcium citrate, and separating the precipitated calcium citrate from the sirup.

12. A method of treating fruit juice containing invert sugars, sucrose and fruit acid for the manufacture of a sirup and fruit acids therefrom, comprising the steps of heating and evaporating the juice to form a sirup, adding a neutralizing agent capable of forming a substantially insoluble salt of fruit acid to said sirup, and then separating the fruit acid salt from the sirup.

13. In a method of treating fruit juices containing invert sugars and fruit acids, the steps of evaporating the fruit juice to form a sirup, adding a neutralizing reagent capable of forming a substantially insoluble salt of fruit acids to said sirup, separating the precipitated fruit acid salt from the sirup, and then decolorizing the sirup.

14. In a method of treating fruit juice containing invert sugars and fruit acid, the steps of evaporating the fruit juice to form a sirup, decolorizing the sirup, adding a neutralizing reagent capable of forming a substantially insoluble salt of fruit acid to said sirup, and separating the precipitated fruit acid salt from the sirup.

15. A method of treating fruit juice containing invert sugars, sucrose and fruit acid for the manufacture of a sirup and salts of fruit acid therefrom, comprising the steps of decolorizing the acid fruit juice, heating and evaporating the decolorized juice to form a sirup, adding a neutralizing agent capable of forming a substantially insoluble salt of fruit acid to said sirup, and then separating the fruit acid salt from the sirup.

16. A method of treating fruit juice containing invert sugars, sucrose and fruit acid for the manufacture of a sirup and salts of fruit acid therefrom, comprising the steps of heating the acid juice to precipitate and coagulate albumens contained in the juice, adding a decolorizing agent to the heated juice, evaporating the juice to form a sirup, separating the decolorizing agent and suspended solids from the sirup, adding a neutralizing agent capable of forming a substantially insoluble salt of fruit acid to said sirup, and then separating the fruit acid salt from the sirup.

17. A method of treating fruit juice containing invert sugars, sucrose and fruit acid for the manufacture of a sirup and salts of fruit acid therefrom, comprising the steps of heating the acid juice to precipitate and coagulate albumens contained in the juice, adding a decolorizing agent to the heated juice, evaporating the juice in the presence of the decolorizing agent to form a sirup, separating the decolorizing agent and suspended solids from the sirup, adding a neutralizing agent capable of forming a substantially insoluble fruit acid salt to said sirup, and then separating the fruit acid salt from the sirup.

18. A method of treating fruit juices containing invert sugars and fruit acids which comprises, evaporating the fruit juice to form a sirup, adding a neutralizing reagent capable of forming a substantially insoluble salt of fruit acid to said sirup at a relatively low temperature, heating the mixture to between 160° F. and 210° F. to precipitate the fruit acid salt, and then separating the precipitated fruit acid salt from the sirup.

19. In a method of treating fruit juices containing invert sugars and fruit acids, the steps of evaporating the fruit juice to form a sirup, adding calcium hydroxide or calcium carbonate to the sirup at a temperature below about 160° F., heating the mixture to between 160° F. and 210° F. to precipitate a substantially insoluble calcium salt of fruit acid, and then separating the precipitated calcium salt fruit acid from the sirup.

CHARLES S. ASH.
EDWARD P. ROLESON.